3,039,147
METHOD FOR MANUFACTURING POLYVINYL CHLORIDE WRAPPING WEB

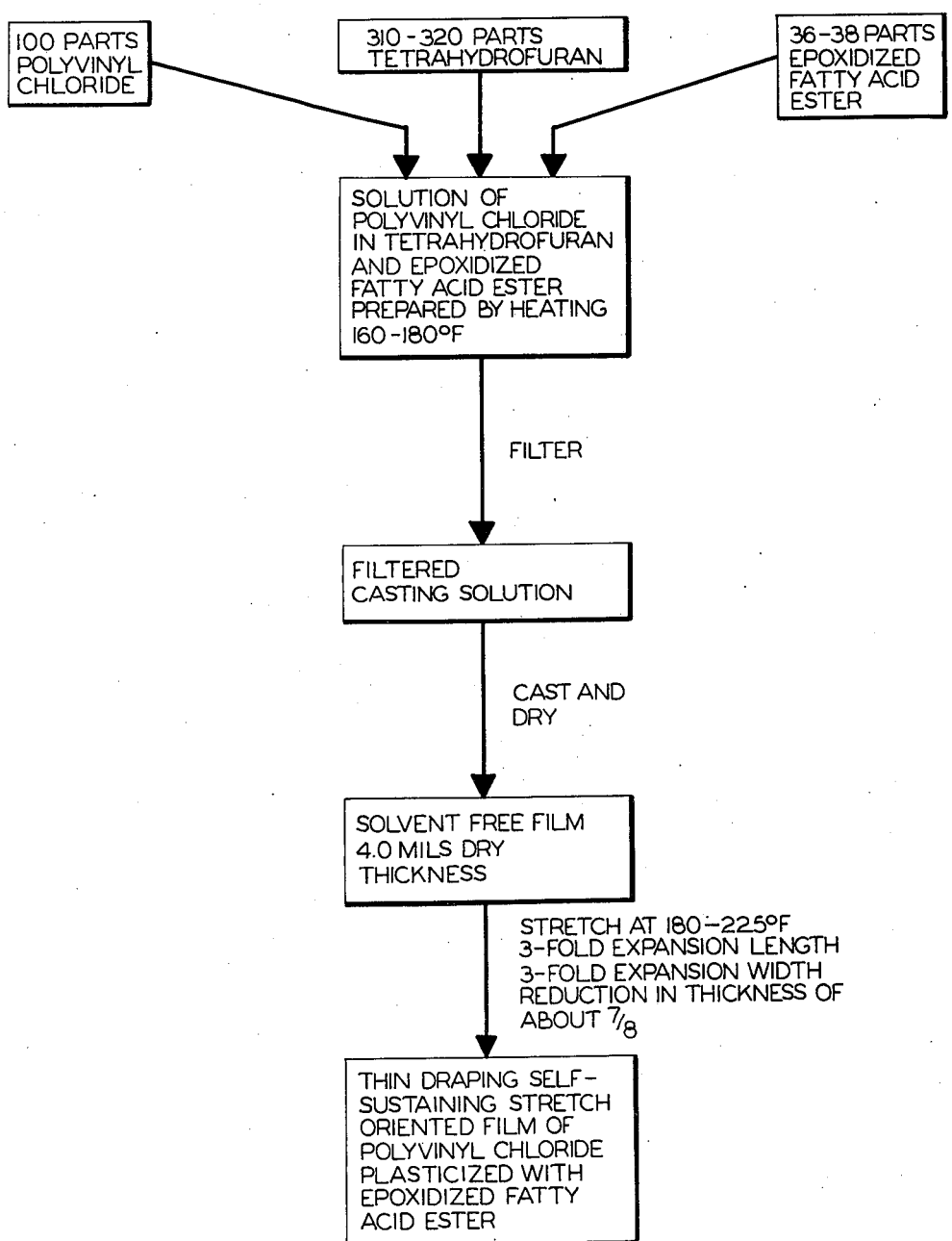

Reginald K. Burkhart, Waynesboro, and Woodrow J. Vogel, Henrico County, Va., and James M. Black, Gary, Ind., assignors to Reynolds Metals Company, Richmond, Va., a corporation of Delaware
Filed Jan. 29, 1960, Ser. No. 5,352
5 Claims. (Cl. 18—57)

The object of the present invention is to provide an improved method for manufacturing plastic web particularly adapted for wrapping articles, as in household uses, and which will have, in addition to satisfactory moisture and gas barrier factors, light resistance and tensile strength with non-toxicity, a "cling" or draping factor which is superior to the product of the kind heretofore marketed.

The present invention is a continuation in part of our now abandoned prior copending application Serial Number 606,584, filed August 12, 1956.

For more than twelve years prior hereto the art has sought unsuccessfully, to produce a thin plastic draping wrap which will not employ polyvinylidene chloride, as is the case with "Saran" (Dow Chemical Co.), which will possess the characteristics of that product, and which may be economically manufactured. By means of the present invention this now has been accomplished and to a degree where there is a decided improvement over the said polyvinylidene type wrap.

The present wrap is characterized by the employment of straight polyvinyl chloride resin, an epoxidized oil plasticizer, and tetrahydrofuran, the first two in critical proportions, enabling the production of exceedingly thin webs, hereinbefore referred to as wraps, which possess improved "drape," which are water clear, of a thickness of about 0.0005 to about 0.001 in., free from odor, of adequate tensile strength yet capable of the tear factor necessary for general household wraps, and of relatively low cost.

In parent application Serial Number 606,584, filed August 28, 1956, there is disclosed a proportion of plasticizer to polyvinyl chloride in parts by weight varying from 28–32 to 100 for the production of thin, draping, self-sustaining polyvinyl chloride wrapping web of the order of 1.5 mils in thickness. It has been discovered in the present application that greater thicknesses using slightly larger critical amounts of epoxidized fatty oil, e.g., 36–38 parts of plasticizer per 100 parts of polyvinyl chloride by weight, provide better moisture, vapor and water barrier characteristics and better drape characteristics in thicker film gauges which are mechanically stronger.

Also in parent application Serial Number 606,584, filed August 28, 1956, there is disclosed an amount of tetrahydrofuran relative to polyvinyl chloride solvent varying from 340–400 parts by weight of solvent to 100 parts by weight of polyvinyl chloride. It has now been found that by lowering and narrowing the limits of amounts needed of this tetrahydrofuran solvent to 310–320 parts by weight of solvent to 100 parts by weight of polyvinyl chloride that wet film thickness can be better controlled to the desired final gauge during casting and a more uniform product is obtained without encountering excessive solvent loss due to use of larger amounts of solvent.

The invention is illustrated in the following examples.

Example I

| | Parts by weight |
|---|---|
| Polyvinyl chloride resin | 100 |
| Tetrahydrofuran | 320 |
| Epoxidized soybean oil | 36 |

Into a chilled mixing tank containing the tetrahydrofuran, which tank may be previously purged with carbon dioxide or nitrogen, is fed the polyvinyl chloride resin along with or in advance of the epoxidized oil. The desired resin is a straight polyvinyl chloride resin with a high crystalline factor (Geon 103 RP, B. F. Goodrich). The entire mix is then heated while under agitation with a temperature range of 160 to 180° F. and mixing carried out under 40 p.s.i.g. pressure of the solvent vapors. The vapors rising from the mixing tank are passed through a condenser serving to effect a continuous reflux.

After the materials have been thoroughly mixed, heated, and completely solvated, the material is cooled to a temperature of 140–145° F. and pumped through a filter to the doctor bar of a casting machine, above and coacting with an endless driven casting belt or band, preferably of stainless steel. All interconnecting piping is jacketed so that the temperature of the material can be maintained at 140–145° F.

The doctor bar is so adjusted relatively to the carrier endless band as to permit a measured amount of the solution to be deposited on the band. The band and doctor bar are preferably of such size as to lay on the driven endless band a wet-film web 54 inches in width and of sufficient thickness to give a dry film having 4.0 mil thickness.

From the point of entry of the solution on the band until all of the solvent has been evaporated, the band will be completely enclosed in a chamber constituting a drying tunnel, and the solvent vapors are conveyed to a solvent recovery unit employing activated carbon for the adsorption of the solvent vapor from the air.

The solvent-free film still on the band is cooled to approximately 70° F. so that it can be stripped from the carrier without appreciable reduction in width. The cooled film is then longitudinally slit, preferably into 27 inch widths and wound on tubular cores which in practice may be 6 inches in diameter. These rolls of film are then taken to stretching equipment situated in an air conditioned, air filtered room for orienting. During the stretching process the material of each slit web will be biaxially stretched to give a three-fold expansion in width (to approximately 81 inches) as well as in length, the film being reduced to ⅛ its initial thickness. During this stretching operation heat is applied constantly to the incoming plastic web to approximately 180 to 225° F.

The quality of stretching is determined both by the uniformity of lateral pull and application of heat. The orienting equipment suitable for the purpose is of a tentering frame type as is currently being employed in the cloth trade. This equipment is essentially the type used for lateral stretch as described in Wiley Patent No. 2,412,-187. Two other methods which may be employed are vacuum orienting and the blown-tube method. All three types are well known in the art and do not require description. The material coming from the orientator will be slit into rolls approximately 12 inches wide. These rolls are then cut into desired lengths.

The epoxidized soybean oil may be produced as follows: 10 grams of soybean oil having an iodine number of 129.4 is mixed with 59 cc. of 1.04 M acetic acid solution of peracetic acid and this reaction mixture was maintained at 20° C. for about four hours, with occasional stirring. The solution was then poured into cold water, and the epoxidized oil which separated out was removed and dissolved in ether. The ether solution was then washed to free entrained acid and dried. Evaporation of the ether yielded colorless epoxidized oil 14.3 iodine number and epoxy oxygen content of 5.05%.

Example II

| | Parts by weight |
|---|---|
| Polyvinyl chloride | 100 |
| Epoxidized castor oil, about | 36 |
| Tetrahydrofuran | 310 |

Using the procedure stated above for the epoxidized soybean oil, 10 grams of castor oil having an iodine number of 84.3 was epoxidized with 32 cc. of a 1.14 M acetic acid solution of peracetic acid for three hours. The recovery, after evaporation of the ether, was 9.4 grams of substantially colorless epoxidized oil, having an iodine number of 8.4 and an epoxy oxygen content of 3.70%.

The epoxidized oil plasticizer must be colorless or substantially so, hence the use of epoxidized soybean and castor oils in the above examples. However, there are equivalent epoxidized oils, Paraplex G–60 (Rohm and Haas), a polymeric oil plasticizer containing epoxy groups being operative, the preferred examples of plasticizer being of a group including epoxidized corn oil, having common characteristics for plasticizing the polyvinyl chloride and stabilizing this resin.

Other epoxidized long chain fatty acid esters which may be used as the plasticizer but which are more expensive are octyl epoxy stearate and epoxidized diacetoglycerides from animal fats. The epoxidized corn oil, epoxidized soybean oil and epoxidized caster oil are preferred by reason of availability in commerce, reproducibility for processing and excellent service experience.

The mixing, heating, casting and other procedures for producing thin plastic webs of the desired characteristics from Example II, may be the same as from Example I. The required result is obtained with proportions of polyvinyl chloride to epoxidized oil of 100 to about 36–38 parts by weight. This is capable of only slight variance, thus 100 parts to 35–38 parts by weight, the highly superior result being at about 36–38 parts of the epoxidized oil. The use of esters of epoxy fatty acids as plasticizers for polyvinyl ester resins has heretofore been proposed, and with ethylene dichloride, butanol, and the like as the solvent factor. But such disclosures lack the teaching and result of our composition. Also it has heretofore been proposed to use tetrahydrofuran as a solvent for polyvinyl chloride along with tricresyl phosphate, chlorinated diphenyl, phthalic acid esters and phosphoric acid esters, as plasticizers in film forming compositions.

Both of these prior disclosures not only lack our combination of polyvinyl chloride, epoxidized fatty acid, and tetrahydrofuran, but the critical ratio of the epoxidized fatty acid to the polyvinyl chloride to secure the necessary properties, with tetrahydrofuran solvent, are not taught in the said disclosures.

Thus the plasticizers heretofore taught as compatible with polyvinyl chloride in tetrahydrofuran, for film forming, i.e., tricresyl phosphate, chlorinated diphenyl, phthalic acid esters and phosphoric acid esters, will not enable production of our product. Each has limited compatibility with the resin and plasticizer, or requires a metal salt stabilizer not approved for food packaging, or otherwise is not feasible; and, as stated, when an epoxidized fatty acid has been proposed with polyvinyl chloride, for film forming the prescribed solvents, i.e., ethylene dichloride, butanol, ethyl ketone, cyclohexanone, isophorone, etc., either give no satisfactory solution because of undissolved gel particles, or, as exemplified by the last two, give such low film solids as to seriously impair film casting.

The steps set out in the following claims are illustrated in the flow diagram attached herewith as the figure of the drawing.

Having described our invention, what we claim and desire to secure by Letters Patent is:

1. A method for manufacturing a thin draping self-sustaining polyvinyl chloride wrapping web comprising mixing about 100 parts by weight of polyvinyl chloride, 36–38 parts by weight of epoxidized long chain fatty acid ester and 310–320 parts by weight of tetrahydrofuran, heating said mixture under agitation at a temperature between about 160 to about 180° F. until the polyvinyl chloride resin is completely solvated, filtering said mixture to remove solid impurities, casting a measured amount of said liquid mixture to provide a wet thin sheet having a thickness of about 4.0 mils as a dry film, evaporating volatile tetrahydrofuran solvent from said wet sheet to form a substantially solvent free sheet, cooling said sheet and stretching said sheet to provide a reduction in thickness of about ⅞ and about a three-fold expansion in length as well as in width while heating said web to a temperature of about 180° F. to about 225° F., and thereby providing a clinging flexible plastic wrapping web adapted to serve as a moisture and gas barrier.

2. A method for manufacturing a thin draping self-sustaining polyvinyl chloride wrapping web comprising mixing about 100 parts by weight of polyvinyl chloride, 36–38 parts by weight of epoxidized fatty oil selected from the group consisting of epoxidized corn oil, epoxidized soya bean oil and epoxidized castor oil; and 310–320 parts by weight of tetrahydrofuran, heating said mixture under agitation at a temperature between about 160 to about 180° F. until the polyvinyl chloride resin is completely solvated, filtering said mixture to remove solid impurities, casting a measured amount of said liquid mixture to provide a wet thin sheet having a thickness of about 4.0 mils as a dry film, evaporating volatile tetrahydrofuran solvent from said wet sheet to form a substantially solvent free sheet, cooling said sheet and stretching said sheet to provide a reduction in thickness to about 0.5 to 1.0 mils and about a three-fold expansion in length as well as in width while heating said web to a temperature of about 180° F. to about 225° F., and thereby providing a clinging flexible plastic wrapping web adapted to serve as a moisture and gas barrier.

3. A method as claimed in claim 2 wherein said mixing of polyvinyl chloride, epoxidized fatty oil, and tetrahydrofuran is carried out under superatmospheric pressure of less than about 40 pounds per square inch gauge pressure.

4. A method as claimed in claim 2 wherein said mixtre is cooled before filtering to a temperature of about 140–145° F.

5. A method for manufacturing a thin draping self-sustaining polyvinyl chloride wrapping web comprising mixing about 100 parts by weight of polyvinyl chloride; about 36–38 parts by weight of epoxidized fatty oil selected from the group consisting of epoxidized corn oil, epoxidized soya bean oil and epoxidized castor oil and about 310–320 parts by weight of tetrahydrofuran, heating said mixture under agitation at a temperature between about 160 to about 180° F. until the polyvinyl chloride resin is completely solvated, filtering said mixture to remove solid impurities, casting a measured amount of said liquid mixture to provide a wet thin sheet having a thickness of at least about 1.5 mils as a dry film, evaporating volatile tetrahydrofuran solvent from said wet sheet to form a substantially solvent free sheet, cooling said sheet and stretching said sheet to provide a reduction in thickness to about 0.5 mil and about a three-fold expansion in width while heating said web to a temperature of about 150° F. to about 180° F., and thereby providing a clinging flexible plastic wrapping web adapted to serve as a moisture and gas barrier.

References Cited in the file of this patent

UNITED STATES PATENTS

| | | |
|---|---|---|
| 2,157,697 | Hagedorn | May 9, 1939 |
| 2,412,187 | Wiley et al. | Dec. 3, 1946 |
| 2,572,315 | Campbell | Oct. 23, 1951 |
| 2,647,101 | Humphrey et al. | July 28, 1953 |
| 2,686,169 | Ham | Aug. 10, 1954 |
| 2,802,801 | Reid et al. | Aug. 13, 1957 |

OTHER REFERENCES

Greenspan et al.: "Ind. and Eng. Chem," vol. 45, No. 12, pp. 2722–2726, December 1953.

Schildknecht: Vinyl and Related Polymers, Wiley and Sons (1952), page 425.